United States Patent [19]

Cordrey et al.

[11] 4,032,599

[45] June 28, 1977

[54] HYDROPHILIC COPOLYMERS

[75] Inventors: Philip William Cordrey, London; Wiktor Mikucki, Thames Ditton, both of England

[73] Assignee: Contact Lenses (Manufacturing) Limited, London, England

[22] Filed: Dec. 9, 1974

[21] Appl. No.: 530,570

Related U.S. Application Data

[63] Continuation-in-part of Ser. No. 245,398, April 19, 1972, abandoned.

[30] Foreign Application Priority Data

Apr. 20, 1971 United Kingdom ............ 10186/71

[52] U.S. Cl. .............................. 260/885; 351/166; 260/895
[51] Int. Cl.² ........................................ C08L 33/12
[58] Field of Search ................ 260/332, 60, 80, 72, 260/895, 882, 885; 351/166; 526/259

[56] References Cited

UNITED STATES PATENTS

| 3,530,201 | 9/1970 | Schwarcz | 260/895 |
|---|---|---|---|
| 3,532,679 | 10/1970 | Steckler | 260/80.72 |
| 3,721,657 | 3/1973 | Seiderman | 260/895 |

*Primary Examiner*—J. Ziegler
*Attorney, Agent, or Firm*—Blanchard, Flynn, Thiel, Boutell & Tanis

[57] ABSTRACT

A hydrophilic copolymer suitable for contact lenses comprises units derived from acrylic acid or methacrylic acid or from a hydrophilic monomer, such as N-vinyl 2-pyrrolidone or 4-vinyl pyridine, containing at least one heterocyclic group as a major hydrophilic unit. The copolymer preferably contains units derived from a hydrophobic monomer, such as methyl methacrylate, and it may also contain units derived from a crosslinking agent and an ethylene oxide-propylene oxide block copolymer. The copolymers are capable of absorbing large quantities of water and are particularly suitable for use in contact with living tissue.

11 Claims, 3 Drawing Figures

HYDROPHILIC COPOLYMERS

CROSS REFERENCE TO RELATED APPLICATION

This application is a continuation-in-part of Ser. No. 245,398, filed Apr. 19, 1972, now abandoned.

The invention relates to hydrophilic copolymers.

According to the invention there is provided a hydrophilic copolymer comprising units derived from at least one of the following monomers: methacrylic acid, acrylic acid; and a hydrophilic monomer containing at least one heterocyclic group as a major hydrophilic unit, for example: an N-vinyl pyrrolidone such as N-vinyl 2-pyrrolidone, or a vinyl pyridine for example: 4-vinyl pyridine. A copolymer such as this has the capacity to absorb large quantities of water whilst still remaining transparent, and the change of shape during water absorption is reliably predictable. Moreover, the copolymer is, in general, relatively resistant to bacterial contamination.

In addition, the hydrophilic copolymer may also include units derived from a hydroxyalkyl methacrylate such as 2-hydroxyethyl methacrylate, or a hydroxypropyl methacrylate such as 2-hydroxypropyl methacrylate.

The hydrophilic copolymer may also include, and preferably does include up to 90% by weight, preferably up to 40% by weight, of units derived from a hydrophobic comonomer, for example an alkyl acrylate, an alkyl methacrylate such as methyl methacrylate, or diethylene glycol bis(allyl carbonate). The molar ratio of the hydrophilic units to the hydrophobic units in the copolymer may vary over a wide range, for example from 8:1 to 1:2, suitably 4:1 to 1:1. Copolymers of these compositions are easily moulded and machined and have high mechanical strength.

The hydrophilic copolymer may also be cross-linked. Cross-linked copolymers such as these may include, as a cross-linking agent, a molecular species having at least two olefinic bonds per molecule. Where the formation of cross-linkages is effected by chemical means, suitable cross-linking agents, include alkylene glycol dimethyacrylate, particularly ethylene glycol dimethacrylate, divinyl benzene, diethylene glycol bis(allyl carbonate), and allyl methacrylate. Two or more such agents can be used together. The degree of cross-linking may be varied widely but is suitably such that the cross-linking agent is present in an amount not more than 10%, preferably not more than 6%, by weight of the monomers. Cross-linked copolymers have even greater mechanical strength.

The preferred hydrophilic copolymers comprise N-vinyl pyrrolidone, particularly N-vinyl 2-pyrrolidone/methyl methacrylate copolymers. The copolymers are preferably cross-linked and suitably contain up to 6%, preferably 1 to 5%, by weight of the cross-linking agent, for example divinyl benzene or ethylene glycol dimethacrylate, based on the combined weight of the two comonomers N-vinyl 2-pyrrolidone and methyl methacrylate. The molar ratio of the N-vinyl pyrrolidone units to the methyl methacrylate in the copolymer may be from 6:1 to 1:2 but is advantageously from 4:1 to 1:1 and preferably from 4:1 to 2:1. Such copolymers have high gas and liquid permeability.

Another preferred copolymer comprises N-vinyl 2-pyrrolidone units and units of a monomer, such as diethylene glycol bis(allyl carbonate), containing two olefinic bonds per molecule. The ratio of the N-vinyl 2-pyrrolidone units to the comonomer units in such case may, for example, be from 10:1 to 2:1 and is suitably about 4:1. Copolymers of this composition have particularly high mechanical strength.

The N-vinyl pyrrolidone copolymers are hard, clear and colourless solids in the non-hydrated condition and remain clear and colourless when hydrated. They have good machining properties and satisfactory mechanical strength. They are also readily prepared.

The water absorptivity of the hydrophilic copolymers differs from copolymer to copolymer and may be varied by varying the degree of cross-linking and by varying the molar ratio of the hydrophilic to the hydrophobic units. The preferred polymers, namely the N-vinyl 2-pyrrolidone/methyl methacrylate copolymers, may absorb more than their own dry weight of water upon being immersed in water for 24 hours. Examples of such copolymers are given hereinafter in Examples 8, 9 and 11.

The hydrophilic copolymers have many uses. In particular, they are very suitable for use in contact with living tissue. Thus, for example, many of the hydrophilic copolymers are particularly suitable for machining into contact lenses, particularly suitable copolymers of this kind being those hereinafter illustrated in Examples 8 to 11. Many of the copolymers are suitable for prosthetic use, for example as heart valves or inserts in the inner ear cavity, and also as dialysis membranes or members in artificial kidney machines. The polymers also have properties suitable for use in reverse osmosis applications.

The invention further provides a protective corneal or eye fitting or membrane which comprises a hydrated hydrophilic copolymer. As a membrane 1-2mm thick, such a membrane is flexible and soft. Suitable copolymers for use as such protective membranes are illustrated in Examples 8, 9 and 11. Such protective membranes or soft lenses are suitable for use, for example, when an eye has been injured or in need of protection for any other reason. The membrane may be made opaque. The protective corneal membrane can in many, if not most, cases replace the swathes of bandages which are commonly used when an eye has suffered injury or has undergone surgical treatment.

The hydrophilic copolymers and articles made from them may include medicinally or therapeutically active ingredients, for example, antibiotics, bactericides, fungicides, steroids, hormone preparations or other drugs, for example mydriacyl, cetamide, dendrid, tropicamide, idoxuridine or sulphacetamide sodium. Such ingredients may be incorporated in the polymerisation stage by adding them to the monomers before or during polymerisation or by absorption from solutions when first hydrating the copolymer. Thus the non-optical, corneal protective membrane may include an antibiotic or other drug and so function not only as a protective membrane for the eye but also as a vehicle for the installation of a drug into the eye.

The hydrophilic solid copolymers may be produced by subjecting monomers to an initiation process. Where the initiation process is carried out by means of a chemical initiator, a cross-linking agent may also be provided. In addition polymerisation, the initiator may, for example, be an organic peroxide or hydroperoxide, a percarbonate such as isopropyl percarbonate, a redox system, or an azo compound. The preferred initiator is azodiisobutyronitrile. The amount of initiator present may be 0.01 to 0.10% by weight of the monomers.

The polymerisation is preferably effected in the substantially complete absence of oxygen, under a gas inert to the polymerisation e.g. nitrogen, or a rare gas, or in vacuo. The polymerisation is preferably begun at a relatively low temperature, for example 35°–50° C, until the monomers have gelled. However, gellation may be effected at any temperature below the boiling point of the monomers used. The temperature is later raised, for example to 50°–60° C, to complete the polymerisation, but polymerisation could also be completed at any temperature below the decomposition temperature of the copolymer. Substantially uniform bubble-free copolymers may therefore be obtained. The period for completing polymerisation may vary from 1 to 16 days or more.

The ratios of comonomers may be varied as hereinbefore indicated as may be the proportion of cross-linking agent when used.

Cross-linked hydrophilic copolymers according to the invention may be produced by effecting copolymerisation prior to, or concurrently with the formation of cross-linkages.

The invention is illustrated in the following examples. Unless otherwise stated, a similar procedure was used in each example. The monomers were placed in a glass tube, azodiisobutyronitrile (AZDN) was added as initiator in an amount of 0.1% w/w of monomer, and the mixture was purged with oxygen-free nitrogen, the nitrogen being bubbled through the liquid for 5–10 mins. In some of the examples, a cross-linking agent and/or water were also added before the purging step. The tube was then sealed, either under vacuum or under nitrogen, and placed in a thermostatically controlled water bath. The tube was maintained initially at 40° C for a period at least sufficient for the monomers to gel, after which the temperature was gradually raised to 60° C and the polymerisation was completed at that temperature.

The solid copolymer was removed from the tube and the top surface layer (1–2mm thick) was removed on a lathe and a 1mm thick disc was cut from the next layer of the rod of copolymer which had a diameter of approximately 20 mm. This disc, which is hereinafter identified as "the 1 mm thick disc" of the copolymer was used to determine the water absorptivity of the copolymer. The disc was weighed under anhydrous conditions and then immersed in distilled water (pH 6.5) and its uptake of water after immersion for 1 day, 4 days and 11 days was determined by reweighing after carefully blotting off all the surface water. The water absorbed is given as a percentage calculated as follows:

$$\% \text{ water absorbed} = \frac{(W_1 - W_o)\,100}{W_o}$$

wherein $W_o$ is the weight of the disc before immersion and $W_1$ its weight after immersion.

The copolymer was also examined in respect of its clarity and mechanicl strength, and its machining properties in a non-hydrated state were observed.

EXAMPLE 1

A mixture of 4.19g freshly distilled acrylic acid, 5.81g methyl methacrylate, 1 ml water and 0.01g AZDN was, in a glass tube, purged with nitrogen and the tube was sealed under nitrogen. The tube was held for 13 days at 40° C (gelation occurred in 12 days), raised gradually to 60° C and maintained at 60° C for 48 hours. The 1 mm thick disc of the polymer was hazy in appearance and the water absorption of the disc, determined as hereinbefore described, was 39.0% after 1 day, 40.4% after 4 days and 41.4% after 11 days immersion.

The disc was, after immersion, soft, pliable, swollen and hazy.

EXAMPLE 2

A mixture of 5.26g N-vinyl 2-pyrrolidone, 4.74g freshly distilled methyl methacrylate, 0.5g divinyl benzene and 0.01g AZDN in a glass tube was purged with nitrogen and sealed in the tube under nitrogen. The tube was then maintained for 10 days at 40° C, followed by 4 days at 50° C and finally 4 days at 60° C. Gellation occurred within 3 days and the solid copolymer produced was hard, clear and colourless. The water absorption of the copolymer, determined on the 1 mm thick disc as hereinbefore described, was 18.7%, 16.9%, and 16.9% after 1 day, 4 days and 11 days respectively. The disc, after 11 days immersion, was clear, fairly flexible and slightly distorted.

To produce a contact lens from this material, polymerisation was carried out in a circular section mould provided with removable plugs having convex and concave spheroidal surfaces complementary to the surfaces of the lens.

A similar technique was used to make a protective corneal fitting except that a dye such as phthalocyaninine blue, phthalocyaninine green, benzidine yellow anlide, iron oxide, or titanium oxide was added to the constituents prior to polymerisation. Another suitable dye is that sold by Imperial Chemical Industries Limited under the trade name SW polymon green GN 500.

EXAMPLE 3

Example 2 was repeated but with the addition of 1 ml water to the initial mixture. The gellation time was 7 days and the copolymer produced was hard, clear and colourless. The water absorption of the copolymer, determined as hereinbefore described, was 25.4%, 23.5% and 23.9% after 1 day, 4 days and 11 days respectively. The disc, after the 11 days immersion, was clear, fairly flexible and slightly distorted.

A membrane of this material was obtaining by pouring the constituents into a shallow tray prior to polymerisation.

EXAMPLE 4

Example 2 was repeated except that 0.5g of ethylene glycol dimethacrylate was used as the cross-linking agent in place of the 0.5g of divinyl benzene. The monomers gelled in 3 days and the copolymer produced was hard, clear and colourless. The water absorption of the copolymer, determined as hereinbefore described, was 19.6%, 19.4%, 17.8% after immersion for 1 day, 4 days and 11 days respectively. The hydrated disc was, after 11 days immersion, fairly flexible, clear and slightly distorted.

A sleeve for an artificial heart valve was machined from a cylindrical workpiece of this material in a lathe.

EXAMPLE 5

A mixture of 7.0g N-vinyl 2-pyrrolidone, 3.0g of freshly distilled methyl methacrylate, 0.5g of ethylene glycol dimethacrylate and 0.01g AZDN was purged with nitrogen in a glass tube, sealed in the tube under nitrogen and then polymerised by being held for 7 days at 40° C, 3 days at 50° C and 4 days at 60° C. The gellation time was less than 3 days and the cross-linked copolymer obtained was a hard, very clear solid. The water absorption of the copolymer upon 1 day, 4 days and 11 days immersion in distilled water was found to be 45.2%, 45.5% and 47.4% respectively. The hydrated disc containing 47.4% was very flexible and very clear.

A metallic prosthetic device was coated in this material by immersion in liquid formed by melting this material.

EXAMPLE 6

Example 5 was repeated with two modifications, namely (i) 0.2g of ethylene glycol dimethacrylate was used instead of 0.5g and (ii) the mixture was held at 40° C for 6 days and not 7 days. The gellation time was less than 3 days and the cross-linked copolymer produced was a very clear, colourless solid. The water absorption of the copolymer, determined as hereinbefore described, was 82.6% after 4 days and 51.3% after 11 days. The hydrated disc was very clear, swollen, soft and very flexible.

By loading this material with a therapeutic agent prior to polymerisation tablets were obtained which were suitable for implantation in the human body after surgery or for oral administration. When these tablets are lodged in human tissue or in the stomach, the therapeutic agent is released into the surroundings in a gradual manner, as a result of transfer of body liquids into and from the tablet material.

EXAMPLE 7

A mixture of 7.5g V-vinyl 2-pyrrolidone, 2.5g methyl methacrylate, 0.5g ethylene glycol dimethacrylate and 0.01g AZDN was purged with nitrogen, sealed in a glass tube under nitrogen and polymerised by being held at 40° C for 6 days, 50° C for 8 days and 60° C for 2 days, the gellation time being less than 1 day. The cross-linked copolymer obtained was a hard solid of great clarity. The water absorption of the copolymer, determined on the 1 mm thick disc as hereinbefore described, was 50.7% in 1 day and 47.9% in 4 days. The disc had broken into pieces when it was examined after being immersed for 11 days in distilled water. The hydrated disc was clear, very flexible and fairly soft.

EXAMPLE 8

Example 7 was repeated but with the use of 0.2g instead of 0.5g of ethylene glycol dimethacrylate. The gellation time was less than 1 day and the cross-linked vinyl pyrrolidone/methyl methacrylate copolymer produced was a hard, very clear solid. Its water absorption was 105.5% after 1 day, 79.9% after 4 days and 65.4% after 11 days. The 11 day-hydrated disc was very clear, very flexible and very soft.

EXAMPLE 9

A mixture of 7.5g N-vinyl 2-pyrrolidone, 2.5g methyl methacrylate, 0.70g allyl methacrylate, 0.005g ethylene glycol dimethacrylate, 0.01g AZDN and 0.005g isopropyl percarbonate was purged with nitrogen in a glass tube and then sealed under nitrogen in the tube and polymerised by being held at 40° C for 6 days, 50° C for 8 days and 60° C for 2 days, the gellation time being less than 1 day. The cross-linked copolymer obtained was a hard solid of great clarity. The water absorption of the copolymer, determined on the 1 mm thick disc as hereinbefore described, was 70% in one day. The hydrated disc was transparent, very flexible and soft.

EXAMPLE 10

A mixture of 7.0g N-vinyl 2-pyrrolidone, 3.0g methyl methacrylate, 0.1g ethylene glycol dimethacrylate and 0.01g. AZDN was purged with nitrogen, sealed under nitrogen in a glass tube and maintained at 40° C for 4 days, 50° C for 5 days and 60° C for 2 days. The solid, cross-linked copolymer so obtained was hard, colourless and of great clarity. The water absorption of the copolymer, determined on the 1 mm thick disc as hereinbefore described, was 70.0% after 1 day and 49.2% after 24 days. The 24 days-hydrated disc was clear and very flexible.

EXAMPLE 11

A mixture of 8.0g N-vinyl 2-pyrrolidone, 2.0g methyl methacrylate, 0.1g ethylene glycol dimethacrylate and 0.01g AZDN was purged with nitrogen and polymerised under nitrogen as described in Example 10. The cross-linked copolymer so produced was a clear, colourless, hard solid. The water absorption of the copolymer determined as hereinbefore described, was 123.0% after 1 day and 67.0% after 24 days. The hydrated disc was very clear, extremely flexible and soft.

EXAMPLE 12

A mixture of 4.62g freshly distilled methacrylic acid, 5.38g methyl methacrylate, 0.5g divinyl benzene and 0.01g AZDN was purged with nitrogen and sealed in a glass tube under nitrogen. The mixture was held for 14 days at 40° C and then for 48 hours at 60° C, the gellation time being 7 days. The 1 mm thick disc was clear and the water absorption, determined as hereinbefore described was 2.1%, 5.9% and 7.9% after 1, 4 and 11 days respectively. The hydrated copolymer was clear but brittle.

EXAMPLE 13

A mixture of 3.3g of each of N-vinyl 2-pyrrolidone, methyl methacrylate and 2-hydroxyethyl methacrylate and 0.2g ethylene glycol dimethyacrylate and 0.01g AZDN was purged with nitrogen and then polymerised under nitrogen by being held at 40° C for 6 days followed by 8 days at 50° C and 2 days at 60° C. The cross-linked copolymer was a very clear, hard solid. The water absorption of the copolymer, determined as hereinbefore described, was 19.8%, 16.1% and 13.3% after 1, 4 and 11 days immersion respectively. The hydrated disc was very clear and slightly flexible.

EXAMPLE 14

The procedure of Example 13 was repeated with one modification, namely that 0.2g instead of 0.5g of ethylene glycol dimethacrylate was used. The copolymer was a very clear, hard solid and its water absorption was 24.6%, 20.6% and 19.7% after 1, 4 and 11 days immersion respectively. The hydrated disc was very clear, distorted and fairly rigid.

EXAMPLE 15

A mixture of 8.0g N-vinyl 2-pyrrolidone and 2.0g of freshly distilled diethylene glycol bis(allyl carbonate) and 0.01g AZDN were purged with nitrogen and then polymerised under nitrogen, the polymerisation being effected by holding the mixture at 50° C for 1 day followed by 3 days at 60° C.

The mechanical properties of the hydrophilic copolymer may be modified by the inclusion of a minor amount of an alkylene oxide polymer, particularly an ethylene oxide-propylene oxide copolymer, especially a block copolymer, and this feature forms an integral and important part of the invention.

A preferred hydrophilic copolymer according to this aspect of the invention consists essentially of copolymerised N-vinyl-2-pyrrolidone and methyl methacrylate, a minor amount of at least one cross-linking agent containing two olefinic bonds in the molecule, and a minor amount of an ethylene oxide-propylene oxide block copolymer which advantageously has a molecular weight of not more than about 6,000.

The ethylene oxide-propylene oxide block copolymer may contain one or more ethylene oxide polymer blocks and one or more propylene oxide polymer blocks. The block copolymer suitably has a molecular weight of at least about 1,000 and advantageously a molecular weight of from about 1,500 to about 5000. The preferred ethylene oxide-propylene oxide copolymer has a molecular weight of from about 3000 to about 4000; such a block copolymer is available on the market under the name Monolan PB and is manufactured by Lankro Chemicals Limited.

The amount of the ethylene oxide-propylene oxide block copolymer used is suitably not more than 10% w/w, advantageously not more than about 5% w/w and preferably not more than about 3% w/w based on the remainder of the hydrophilic copolymer which is preferably constituted essentially by N-vinyl-2-pyrrolidone units, methyl methacrylate units and units of a cross-linking agent. The minimum amount of the block copolymer used may be about 0.25% w/w or about 0.5% w/w. Generally, the amount of the modifier or block copolymer used is preferably not more than about 2% w/w and about 1% w/w of the modifier is frequently an appropriate amount.

The molar ratio of the N-vinyl-2-pyrrolidone to the methyl methacrylate is suitably from about 6:1 to about 1:1 and is preferably from about 4:1 to about 1:1.

Suitable cross-linking agents include allyl methacrylate, divinyl benzene, dimethacrylates and bis(allyl carbonates) of alkylene glycols and polyalkylene glycols, for example, ethylene glycol dimethacrylate and diethylene glycol bis(allyl carbonate). The preferred cross-linking agent present may be, for example, from about 0.2 to about 5%, suitably not more than 2%, by weight of the copolymerised N-vinylpyrrolidone and methyl methacrylate.

Inter alia, the tensile strength, elongation at break and resistance to fracture upon flexure of the hydrated copolmer are improved by the ethylene oxide-propylene oxide block copolymer, particularly the block copolymer having a molecular weight of from about 3000 to about 4000 such as that sold under the name Monolan PB.

EXAMPLE 16

To 4 parts by weight (hereinafter abbreviated to pbw) of N-vinyl-2-pyrrolidone, 1 pbw methyl methacrylate and 0.50 pbw of a cross-linking mix consisting of a mixture of 900 pbw methyl methacrylate and 120 pbw allyl methacrylate were added 1% w/w (that is, 0.055 pbw) of the ethylene oxide-propylene oxide block copolymer of about 3000–4000 molecular weight available under the name Monolan PB followed by 0.01 pbw AZDN and 0.005 pbw isopropyl percarbonate. The whole mixture was disposed in a glass tube, purged with nitrogen and then sealed under nitrogen in the tube after which the mixture was polymerised at 40° C for 6 days, 50° C for 8 days and 60° C for 2 days. The copolymer (hereinafter designated as copolymer A) obtained was a hard, clear solid. The equilibrium water absorption or moisture content of copolymer A, determined on the 1 mm thick disc as hereinbefore described but using isotonic saline solution rather than distilled water, was 70%. The hydrated disc was transparent, flexible and soft.

EXAMPLES 17–20

Example 16 was repeated but using 2% w/w, 3% w/w, 4% w/w and 5% w/w instead of 1% w/w of the modifier, that is Monolan PB, to give four copolymers hereinafter designated as copolymers B, C, D and E respectively. Copolymers B and C were hard and clear solids. Copolymers D and E were not as hard as copolymers B and C and whilst copolymer D was clear, copolymer E showed some haze or cloudiness. The equilibrium water absorptions or moisture contents of copolymers B, C, D and E determined, as in Example 16, with isotonic saline solution instead of distilled water, were 69.3%, 68.1%, 67.3% and 66.5% respectively. The four hydrated discs were flexible, those of copolymers B, C and D being clear and that of copolymer E being hazy or cloudy.

EXAMPLE 21

Example 16 was repeated except that Monolan PB was omitted. The copolymer (hereinafter designated as copolymer Z) obtained was a hard, clear solid the equilibrium water absorption or moisture content (determined with isotonic saline solution) of which was 71%. The hydrated disc was transparent, flexible and soft.

EXAMPLE 22

Example 16 was repeated except that 10% w/w instead of 1% w/w of the modifier, Monolan PB, was used.

EXAMPLE 23 Example 16 was repeated except that 3 pbw instead of 4 pbw of N-vinyl-2-pyrrolidone were used and that 1 pbw instead of 0.5 pbw of the cross-linking mix was used.

EXAMPLE 24

Example 16 was repeated except that there were used (a) 5 pbw instead of 4 pbw of N-vinyl-2-pyrrolidone, (b) 0.20 pbw instead of 0.50 pbw of the cross-linking mix and (c) 2% w/w instead of 1% w/w of Monolan PB.

Some of the advantageous effects of including the ethylene oxide-propylene oxide copolymer as a modifier in the hydrophilic copolymer composition are illustrated by way of example with reference to the accompanying drawings in which.

The linear expansion ratio of a hydrophilic copolymer is the ratio of a linear dimension of a specimen of the copolymer when the copolymer is fully hydrated in isotonic saline to the corresponding linear dimension when the specimen is dry. This ratio is of critical importance to the success of a process of making lenses from the copolymer, since the lenses are cut with the dry copolymer to a complex formula which provides the proper prescription after each cut lens has been hydrated. Thus any inaccuracy in the value of the ratio between batches of material will adversely affect the standard of the final lens. The lenses are cut to have a hydrated curvature which must be accurate to 0.05 mm on a base curve of 8.0 mm and thus the value of the linear expansion ratio must be accurate to a similar degree, that is, better than 5 in 800.

Figure 1:
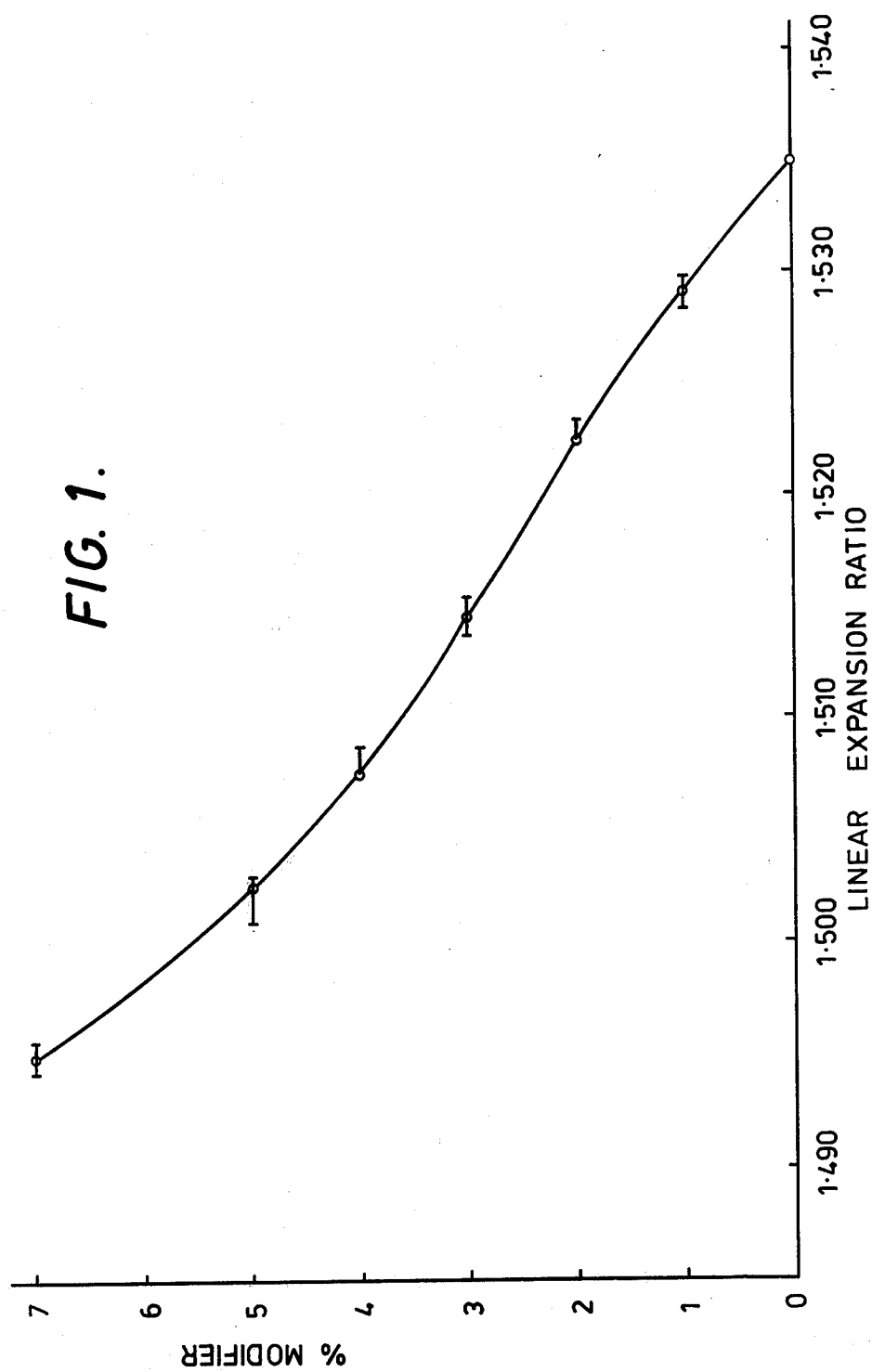
FIG. 1 shows a plot of the linear expansion ratio against the percent w/w of modifier present.

The linear expansion ratios of copolymers Z, A, B, C, D and E were determined and found to be 1.535, 1.529, 1.523, 1.514, 1.508 and 1.502 respectively. A further copolymer prepared as in Example 16 but with 7% w/w instead of 1% w/w of Monolan PB, was found to have a linear expansion ratio of 1.495. These results are plotted in FIG. 1 in which the error bars show the spread of the three determinations which were effected in each instance. Thus the modifier, Monolan PB, provides a valuable control on the final properties of the copolymer.

The tensile strength of the hydrophilic copolymer in the hydrated state is a matter of great importance where the hydrated copolymer has to be handled daily as it does when it is used as a contact lens. The tensile strengths of copolymers A, B, C and D in the equilibrium hydrated state were determined. Copolymers were prepared without Monolan PB (that is, from N-vinyl-2-pyrrolidone, methyl methacrylate and allyl methacylate only) in the manner described in Example 21 but the N-vinyl-2-pyrrolidone to methyl methacrylate molar ratios were varied to give four copolymers A', B', C' and D' having the same equilibrium moisture contents as copolymers A, B, C and D respectively, and the tensile strengths of copolymers A', B', C' and D' in that equilibrium hydrated state were also determined. The results were then presented as the following ratios $$\frac{T.S. \text{ of copolymer } A}{T.S. \text{ of copolymer } A'}, \frac{T.S. \text{ of copolymer } B}{T.S. \text{ of copolymer } B'},$$

$$\frac{T.S. \text{ of copolymer } C}{T.S. \text{ of copolymer } C'} \text{ and } \frac{T.S. \text{ of copolymer } D}{T.S. \text{ of copolymer } D'}$$

where T.S. denotes the tensile strength of the copolymer in the equilibrium hydrated state. The results are presented in this manner in order to eliminate the separate effect of the water content on the tensile strength and so clearly show the effect of the block copolymer modifier i.e. Modolan PB, on the tensile strength of the hydrated copolymer.

Figure 2:
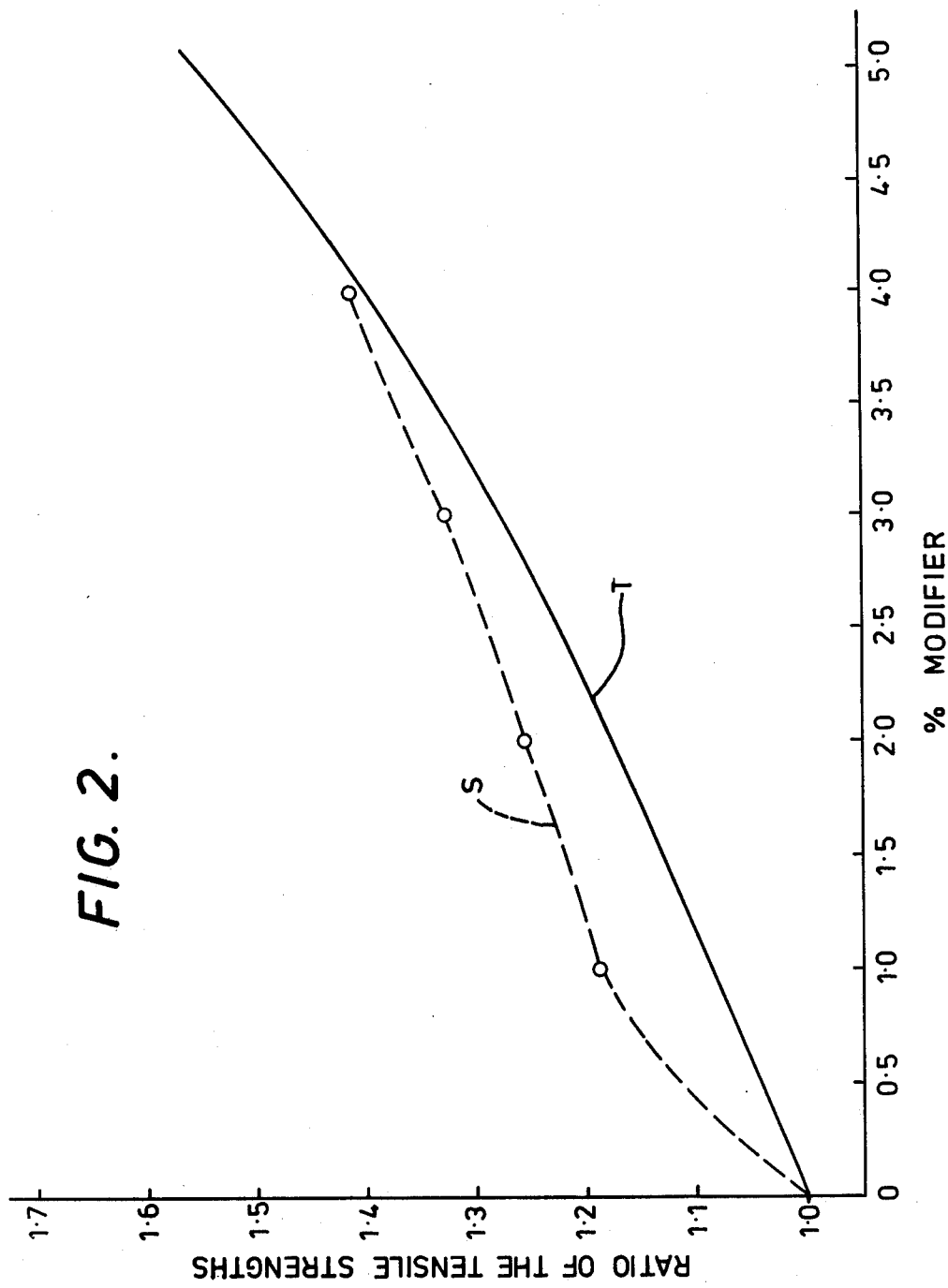
FIG. 2 shows a plot of the ratio of the tensile strengths of the hydrophilic copolymer containing the modifier and a similar plot for hydrophilic copolymer containing none of the block copolymeric modifier.

FIG. 2 shows curve S which is a plot of the said ratios of the tensile strengths plotted against the percent block copolymeric modifier (Modolan PB).

Curve T in FIG. 2 is a plot of the ratios of the $$\frac{T.S. \text{ of copolymer } A' \text{ or } B' \text{ or } C' \text{ or } D'}{T.S. \text{ of copolymer } Z}$$

T.S. having the meaning hereinbefore given, with copolymers A', B', C' and D' being plotted on the same abscissae as copolymers A, B, C and D respectively. It is clear from FIG. 3 that the addition of up to 3% of Monolan PB has a marked effect in improving the tensile strength of the hydrophilic copolymer in the hydrated state.

The percentage elongation at break of the hydrophilic copolymer in the hydrated state is an important parameter when the copolymer is used as a contact lens, for it is common practice to fold the lens in half when removing it from the eye for hydration or storage in an appropriate solution and when removing it from the solution and replacing it in the eye. This folding in half produces strains of 100% or more at the outside of the curve of the fold.

As with tensile strength, the elongation to break of the copolymer at equilibrium hydration is a function of the water content of the hydrated copolymer and the water content at equilibrium hydration can be varied by varying the N-vinyl pyrrolidone/methyl methacrylate molar ratio of the copolymer. The effect of Monolan PB should therefore be assessed separately.

The elongations at break of copolymers Z, A, B, C, D and E were determined and the mean of six runs was taken. The results are shown in the following Table 1:

TABLE 1

| COPOLYMER | Z | A | B | C | D | E |
|---|---|---|---|---|---|---|
| % BLOCK COPOLYMERIC MODIFIER | 0 | 1 | 2 | 3 | 4 | 5 |
| ELONGATION % AT BREAK | 234 | 230 | 225 | 217 | 219 | 209 |
| STANDARD % DEVIATION | 30.4 | 22.3 | 31.1 | 27.4 | 32.1 | 46.6 |
| MOISTURE CONTENT % | 71 | 70 | 69.3 | 68.1 | 67.3 | 66.5 |

Figure 3:
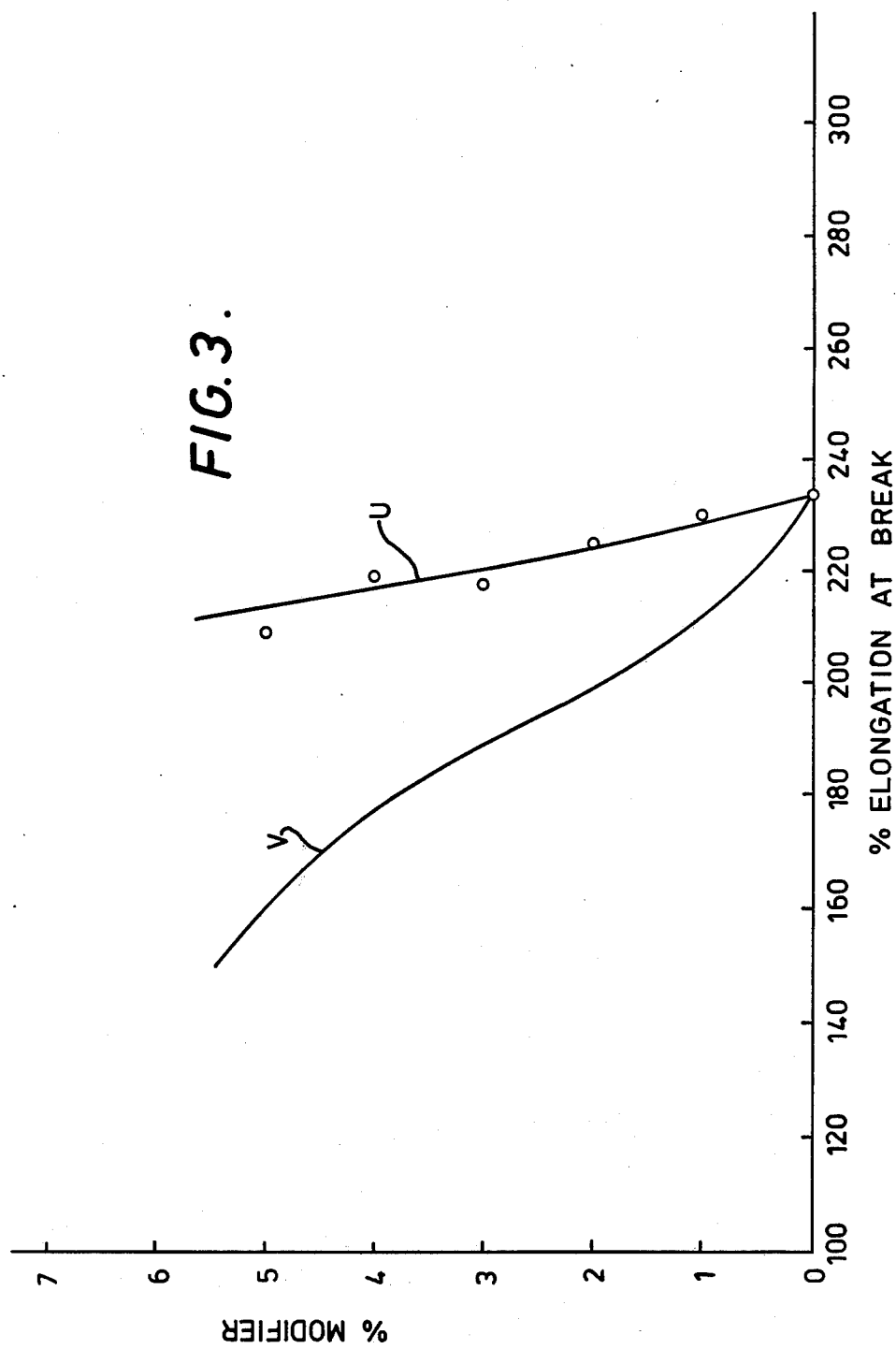
FIG. 3 shows a plot of the percent elongation at break of the modified hydrophilic copolymer and a similar plot for the unmodified hydrophilic copolymer.

The elongation at break of copolymers A, B, C, D and E is in FIG. 3 plotted against the percentage content of the modifier, namely MONOLAN PB, giving curve U. Copolymer Z was modified solely by varying its N-vinyl-2-pyrrolidone/methyl methacrylate molar ratio to provide five copolymers A', B', C', D' and E' having the same equilibrium water contents as copolymers A, B, C, D and E. The percent elongations at break of copolymers A', B', C', D' and E' were determined in the same manner as that used with copolymers A, B, C, D and E and the results plotted in FIG. 3, curve V being thereby obtained. In plotting curve V, the ordinate values were determined by the equilibrium water content of the particular copolymer so that the ordinate values for copolymers A', B', C', D' and E' were respectively the same as for copolymers A, B, C, D and E.

Thus the equilibrium water content of the hydrophilic copolymer may be varied, which variation alters the linear expansion ratio, (a) by varying the N-vinyl pyrrolidone/methyl methacrylate or (b) by incorporating Modolan PB in the copolymer. As is evident from FIG. 3, the latter method (b) results in a lesser degradative effect on the elongation at break of the copolymer.

The effect of repeated flexure upon the life of a contact lens made from the hydrophilic copolymer is also a matter of great importance. The mechanism of the damage which occurs is presumed to be the formation of microcracks in the flexed surface as the surface begins to dry. Such microcracks are then propagated when the lens is next hydrated.

Tests were carried out in a standard rig in which specimens of the hydrophilic copolymers suitable for the production of contact lenses were subjected to repeated flexure for a period of 5 minutes after removal from a storage solution, the specimens being then rehydrated in the solution and the 5 minute flexing period repeated. In each 5 minute period, each specimen underwent 50 cycles of flexure.

Specimens of copolymers Z, A, B and C were tested, five specimens of each copolymer being tested to breaking and the mean of the five numbers of flexures to break calculated. The results are shown in the following Table 2:

TABLE 2

| Copolymer | Z | A | B | C |
|---|---|---|---|---|
| % Modifier (Monolan PB) | 0 | 1 | 2 | 3 |
| Mean of Flexures to break | 1080.4 | 1306 | 1107 | 1006 |
| Standard deviation | 90.6 | 115.6 | 94.6 | 82.1 |

It is evident from the results that up to about 2% of the ethylene oxide-propylene oxide block copolymer used as modifier, increases the resistance of the hydrophilic copolymer to damage upon flexure.

We claim:
1. A hydrophilic copolymer obtained by forming a polymerization reaction mixture consisting essentially of (A) N-vinyl-2-pyrrolidone, (B) methyl methacrylate, (C) at least one cross-linking agent having at least two olefinic double bonds in its molecule and (D) an ethylene oxide-propylene oxide block copolymer having a molecular weight in the range of from at least about 1000 to not more than about 6000, the molar ratio of (A) : (B) being from about 6:1 to about 1:1, the amount of (C) being from about 0.2 to about 5% by weight based on the weight of (A) plus (B), and the amount of (D) being from about 0.25% to not more than 10% by weight based on the sum of the weights of (A) plus (B) plus (C), polymerizing said polymerization reaction mixture at a temperature of from 35° to 50° C until the monomers have gelled and then raising the temperature to 50° to 60° C and completing the polymerization at the latter temperature and thereby obtaining the hydrophilic copolymer.

2. A hydrophilic copolymer according to claim 1, in which the molar ratio of (A) : (B) is from about 4:1 to about 1:1.

3. A hydrophilic copolymer according to claim 2, in which (C) is allyl methacrylate.

4. A hydrophilic copolymer according to claim 3, in which (D) is present in an amount of not more than about 5% by weight based on the weight of (A) plus (B) plus (C).

5. A hydrophilic copolymer according to claim 4, in which (D) has a molecular weight in the range 1,500 to 5,000.

6. A hydrophilic copolymer according to claim 5, in which (D) has a molecular weight of from about 3,000 to about 4,000.

7. A hydrophilic copolymer according to claim 6, in which the amount of (D) is from about 0.5 to about 3%, based on the total weight of (A) plus (B) plus (C).

8. A hydrophilic copolymer according to claim 2, in which (C) is allyl methacrylate, in an amount of not more than 2% by weight of (A) plus (B).

9. A contact lens made from the hydrophilic copolymer claimed in claim 7.

10. A hydrophilic copolymer according to claim 1 in which the polymerizing step is carried out by adding to the polymerization reaction mixture from 0.01 to 0.10% by weight, based on the weight of (A) plus (B) plus (C), of a polymerization initiator, then polyermezing the polymerization reaction mixture under an inert gas atmosphere, or in vacuo, until polymerization is completed.

11. A hydrophilic copolymer according to claim 1, in which (C) is selected from the group consisting of allyl methacrylate, divinyl benzene, ethylene glycol dimethacrylate and diethylene glycol bis(allyl carbonate).

* * * * *